United States Patent
Saenger Nayver et al.

(10) Patent No.: US 12,504,665 B2
(45) Date of Patent: *Dec. 23, 2025

(54) BUFFER PRE-ACTIVATION FOR ELECTROCHROMIC DEVICE

(71) Applicant: Gentex Corporation, Zeeland, MI (US)

(72) Inventors: Mario F. Saenger Nayver, Holland, MI (US); John S. Anderson, Holland, MI (US); George A. Neuman, Holland, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/663,298

(22) Filed: May 14, 2024

(65) Prior Publication Data

US 2024/0295788 A1 Sep. 5, 2024

Related U.S. Application Data

(62) Division of application No. 17/159,324, filed on Jan. 27, 2021, now Pat. No. 12,019,346.

(60) Provisional application No. 62/969,359, filed on Feb. 3, 2020.

(51) Int. Cl.
G02F 1/163 (2006.01)
G02F 1/1514 (2019.01)

(52) U.S. Cl.
CPC .............. *G02F 1/163* (2013.01); *G02F 1/1514* (2019.01)

(58) Field of Classification Search
CPC ............................ G02F 1/163; G02F 1/1514

USPC ......................................................... 359/265
See application file for complete search history.

(56) References Cited

U.S. PATENT DOCUMENTS

| 6,433,914 | B1 | 8/2002 | Lomprey et al. |
| 7,193,764 | B2* | 3/2007 | Lin ...................... G02F 1/1506 |
| | | | 359/272 |
| 12,019,346 | B2* | 6/2024 | Saenger Nayver ..... G02F 1/163 |
| 2011/0255142 | A1 | 10/2011 | Ash et al. |

(Continued)

OTHER PUBLICATIONS

Wikipedia webpage "Biasing," 2019.
Wikipedia webpage "Standby Power," 2019.

*Primary Examiner* — George G. King
(74) *Attorney, Agent, or Firm* — Price Heneveld LLP; Brian James Brewer (57) ABSTRACT

An electrochromic device, system using, and method for, which may pre-activate a buffer is disclosed. The electrochromic device may comprise a first substrate, a second substrate, a first electrode, a second electrode, and an electrochromic medium. The second substrate may be disposed in apart relationship with the first substrate. The first and second electrodes may be associated with the first and second substrates, respectively. The electrochromic medium may be disposed between the first and second electrodes. Further, the electrochromic medium may comprise electrochromic materials and a redox buffer. Each of the electrochromic materials and the buffer may be operable between activated and deactivated states. The electrochromic device may be configured to apply a voltage to substantially pre-activate the buffer and hold the buffer in this state prior to substantially activating the electrochromic materials, thereby decreasing the response time of the electrochromic device upon activation.

12 Claims, 5 Drawing Sheets

(56) References Cited

U.S. PATENT DOCUMENTS

2012/0062975 A1 3/2012 Mehtani et al.
2016/0139477 A1 5/2016 Jack et al.

* cited by examiner

FIG. 7

BUFFER PRE-ACTIVATION FOR ELECTROCHROMIC DEVICE

CROSS-REFERENCE TO RELATED APPLICATIONS

This application is a divisional of U.S. patent application Ser. No. 17/159,324 filed Jan. 27, 2021, entitled "BUFFER PRE-ACTIVATION FOR ELECTROCHROMIC DEVICE," which claims priority under 35 U.S.C. § 119 (e) to U.S. Provisional Application No. 62/969,359 filed on Feb. 3, 2020, entitled "BUFFER PRE-ACTIVATION FOR ELECTROCHROMIC DEVICE," the disclosures of which are hereby incorporated by reference in their entirety.

FIELD OF INVENTION

The present invention relates in general to electrochromic devices and, more particularly, to operating electrochromic devices having an electrochromic solution comprising one or more buffer and one or more electrochromic material.

BACKGROUND OF INVENTION

Electrochromic devices have been well known for many years. When a sufficient electrical potential is applied across a pair of electrodes, an electrochromic medium, disposed between the electrodes, may become activated, changing its color and/or light transmissivity. Taking advantage of this, devices such as dimmable mirrors and windows have become increasingly popular the automotive and aviation industries.

However, during normal operation, electrochromic media sometimes do not adequately return to a predetermined state. In some instances—even in the absence of an electrical potential—anodic and cathodic materials of the electrochromic materials may oxidize or reduce, respectively. This oxidation or reduction of the electrochromic medium may be undesirable. This undesirable oxidation or reduction may be caused by undesirable electrochromic medium impurities, exposure of the electrochromic medium to the external atmosphere, and/or long-term weathering of the electrochromic device.

To mitigate issues associated with returning the electrochromic medium to a predetermined state and preventing undesirable coloration, redox buffers are implemented. These redox buffers are combined with the electrochromic medium to form an electrochromic solution. However, when the electrical potential is applied to the electrochromic solution, these buffers may slow down the darkening of an electrochromic device. Accordingly, there is a need for an improved system for using buffers in an electrochromic device that eliminates or reduces the reduction in darkening time caused by the buffer. When an imbalance of anodic oxidation and cathodic reduction occurs, an undesirable electrochromic medium coloration may manifest in the electrochromic device.

SUMMARY

In accordance with the present disclosure, the disadvantages and problems associated with electrochromic devise incorporating buffers in the past are eliminated or reduced.

In accordance with one aspect of the present disclosure, a device is disclosed. The device may comprise a first substrate, a second substrate, a first electrode, a second electrode, and an electrochromic medium is disclosed. The first substrate may have a first surface and a second surface. Similarly, the second substrate may have a third surface and a fourth surface. Further, the second substrate may be disposed in a spaced-apart relationship with the first substrate such that the second and third surfaces face one another. The first electrode may be disposed on the second surface. The second electrode may be disposed on the third surface. The electrochromic medium may be disposed between the first and second electrodes. Further, the electrochromic medium may comprise electrochromic materials and a redox buffer. The electrochromic materials and the buffer may each be operable between activated and deactivated states.

The first and second electrodes may be operable to operable to: initiate a first voltage, hold the first voltage, initiate a second voltage, and hold the second voltage. The first voltage may be operable to substantially activate the buffer. In some embodiments, the first voltage is not operable to substantially activate the electrochromic materials. Holding the first voltage may be operable to maintain the substantial buffer activation. The second voltage may be greater than the first voltage in magnitude and have the same polarity as the first voltage. Further, the second voltage may be operable to substantially increase the degree of activation of the electrochromic materials. Holding the second voltage may be operable to maintain the increased electrochromic material activation.

In some embodiments, the first and second electrodes may be further operable to: initiate a third voltage, hold the third voltage, initiate a fourth voltage, and hold the fourth voltage. The third voltage may be opposite in polarity relative the first and second voltages holding the third voltage may be operable to substantially de-activate the electrochromic materials. In some of these embodiments, the first and third voltages may be equal in absolute magnitude. The fourth voltage may be of the same polarity as the first and second voltages. Further, the fourth voltage may be operable to substantially activate the buffer. In some of these embodiments, the fourth voltage may be substantially equal to the first voltage. Further, the fourth voltage may not be operable to substantially activate the electrochromic materials. Holding the fourth voltage may be operable to maintain the buffer in a substantially activated state.

In other embodiments, the first and second electrodes may be further operable to: initiate a third voltage and hold a third voltage. The third voltage may be operable to substantially change the degree of activation of the electrochromic materials. Further, the third voltage may be different from the first voltage. Holding the third voltage may be operable to maintain activation of the electrochromic materials. In some of these embodiments, the first and second electrodes may be even further operable to: initiate a fourth voltage, hold the fourth voltage, initiate a fifth voltage, and hold the fifth voltage. The fourth voltage may be opposite in polarity relative the first, second, and third voltages. Holding the fourth voltage may be operable to substantially de-activate the electrochromic materials. The fifth voltage may be of the same polarity as the first, second, and third voltages. Further, the fifth voltage may be operable to substantially activate the buffer. In some of these embodiments, the fifth voltage may not be operable to substantially activate the electrochromic materials. Holding the fifth voltage may be operable to maintain the buffer in an activated state.

In yet other embodiments, the device may be associated with a vehicle. Further, the device may be operable to receive a signal from a sensor associated with the vehicle. The sensor may be further associated with the device. In some of these embodiments, the sensor may be an imager. The sensor may correspond to the detection of a standby triggering condition by the sensor. In some of these embodiments, the standby triggering condition may be the occupancy of the vehicle. The first and second electrodes may accordingly be further operable to initiate the first voltage based, at least in part, on the detection of the standby triggering condition. Additionally or alternatively, the device may be operable to substantially deactivate the buffer when the signal is no longer received.

In yet other embodiments, the device may be associated with a vehicle. Further, the device may be operable to receive a signal from a sensor likewise associated with the vehicle. The signal may correspond to the detection of a hibernation triggering condition by the sensor. The first and second electrodes may accordingly be further operable to substantially stop voltage application to the electrochromic medium based, at least in part, on the received signal.

In accordance with another aspect of the present disclosure, a method is disclosed. The method may comprise the steps of initiating a first voltage, holding the first voltage, initiating a second voltage, and holding the second voltage. The first voltage may be applied to an electrochromic medium. The electrochromic medium may comprise electrochromic materials and a redox buffer. The electrochromic materials and buffer may each be electroactive and operable between substantially activated and deactivated states. The first voltage may be operable to substantially activate the buffer and not substantially activate the electrochromic materials. Holding the first voltage is operable to maintain the buffer in a substantially activated state. The second voltage may likewise be applied to the electrochromic medium. The second voltage may be operable to substantially increase the degree of the activation of the electrochromic materials. Further, the second voltage may be greater than the first volt age. Holding the second voltage may be operable to maintain the increased activation of the electrochromic materials.

In some embodiments, the method may further comprise the steps of lowering the voltage from the second voltage to a third voltage, holding the third voltage, increasing the voltage from the third voltage to a fourth voltage, and holding the fourth voltage. The third voltage may be opposite in sign relative the first and second voltages. Holding the third voltage may be operable to substantially de-activate the electrochromic materials. The fourth voltage may be of the same sign as the first and second voltages. Further, the fourth voltage may be operable to substantially activate the buffer and not substantially activate the electrochromic materials. Holding the fourth voltage may be operable to maintain the buffer in a substantially activated state.

In accordance with yet another aspect of the present disclosure, a system is disclosed. The system may comprise an electrochromic device and a controller. The electrochromic device may comprise an electrochromic medium. The electrochromic medium may comprise electrochromic materials and a redox buffer. The controller may be operable to: initiate a first voltage, hold the first voltage, initiate a second voltage, and hold the second voltage. The first voltage may be applied across the electrochromic medium. Further, the first voltage may be operable to substantially activate the buffer. Holding the first voltage may be operable to substantially maintain the buffer activation. The second voltage may be applied across the electrochromic medium. Further, the second voltage greater than the first voltage and operable to substantially increase an activation state of the electrochromic materials. Holding the second voltage may be operable to maintain the increased activation of the electrochromic materials.

In some embodiments, the system may further comprise a first sensor. The first sensor may be operable to detect a standby triggering condition. The standby triggering condition may be at least one of a vehicle starting and a vehicle occupancy. Accordingly, the controller may be further operable to receive a signal from the sensor. The signal may correspond to the detection of the standby triggering condition. Further, based, at least in part, on the detection of the standby triggering condition, the controller may initiate the first voltage.

In some such embodiments, at least one of the first sensor and a second sensor are operable to detect a hibernation triggering condition. Accordingly, the controller may be further operable to receive a second signal from the at least one of the first sensor and the second sensor. The second signal may correspond to the detection of the hibernation triggering condition. Further, based, at least in part, on the receipt of the second signal, the controller may initiate a third voltage. The third voltage may be operable to substantially deactivate the buffer.

The advantages of certain embodiments of the present disclosure include a faster and more responsive electrochromic device. Application of a buffer pre-activation voltage partially activates the electrochromic solution, such that the buffer is fully activated prior to a desired change in electrochromic device transmittance. Accordingly, when an electrical potential is applied to change electrochromic device transmittance, the buffer will not have increased consumption of the electrical current, because the buffer is already activated, and therefore allow the electrochromic materials to consume a greater amount of this current and thereby activate faster, increasing the speed of transmittance change.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

For the purposes of description herein, it is to be understood that the specific devices and processes illustrated in the attached drawings and described in this disclosure are simply exemplary embodiments of the inventive concepts defined in the appended claims. Hence, specific characteristics relating the embodiments disclosed herein are not to be considered as limiting, unless the claims expressly state otherwise.

The present disclosure is directed to an electrochromic device with and/or method for, buffer pre-activation. Electrochromic devices generally comprise an electrochromic medium, the electrochromic medium may contain a solvent, one or more electrochromic materials, and/or a buffer. The buffer may be a redox buffer. Generally, to act as a redox buffer, a buffer may exhibit a redox potential in the range bound by an anodic oxidation potential and a cathodic reduction potential of the electrochromic materials. Accordingly, the buffer may be activated at a lower electrical potential than the electrochromic materials. Therefore, when the electrochromic device applies an electrical potential to the electrochromic solution, the buffer may slow the change in transmittance of the electrochromic device. This is because the buffer may consume electrical current, thus reducing the available electrical current for activation of the electrochromic materials. This reduction in available current may increase the time required to activate the electrochromic materials. Also, generally, the buffer is preferably activated over the electrochromic medium due to its lower activation potential, thereby increasing a lag time in electrochromic activation.

This disclosure relies on applying a buffer pre-activation voltage to reduce and/or eliminate this lag time. A voltage is a measure of an electromotive force or electrical potential. The buffer pre-activation voltage may be initiated to pre-activate the buffer before electrochromic device darkening is desired. The buffer pre-activation voltage may be equal to the activation potential of the buffer. Further, the buffer pre-activation voltage may be held to maintain the buffer's activation. This may produce a buffer activated stand-by state of the electrochromic medium, ready for immediate activation of the electrochromic materials. To activate the electrochromic materials, the applied voltage may be increased from the buffer pre-activation voltage to an electrochromic activation voltage corresponding to a desired degree of electrochromic activation. This electrochromic activation voltage may be held for the duration of the desired electrochromic activation. As a result, a faster and more responsive electrochromic device may be achieved.

Additionally, the present disclosure is also directed to the deactivation of the electrochromic materials. Once electrochromic material activation is no longer desired, the buffer may be returned to its standby state wherein the buffer is pre-activated. Accordingly, once electrochromic material activation is no longer desired, the electrochromic activation voltage may be decreased to an electrochromic deactivation voltage, thereby speeding up the deactivation of the electrochromic medium by removing electrons. The electrochromic deactivation voltage may be substantially equal to the negative of the buffer pre-activation voltage. Further, the electrochromic deactivation voltage may be held to maintain the electrochromic materials' deactivation process. Once the electrochromic materials are sufficiently deactivated, the voltage may be increased to the buffer pre-activation voltage and held, rapidly returning the electrochromic solution and device to a standby state. As a result, the electrochromic device may be more rapidly returned to its pre-activated standby state than: if the voltage is simply returned to the buffer pre-activation voltage, if the electrodes are shorted, or if the electrodes are left in open circuit configuration.

Figure 1A:
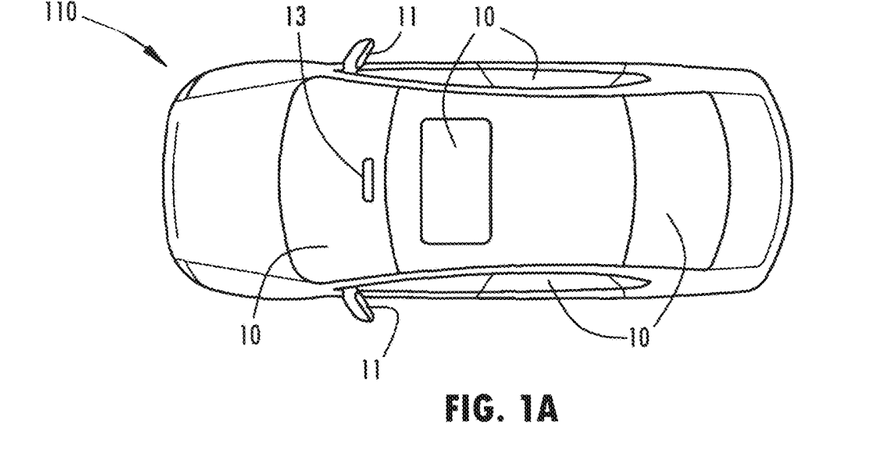
FIG. 1a: An embodiment of an electrochromic device.
Figure 1B:
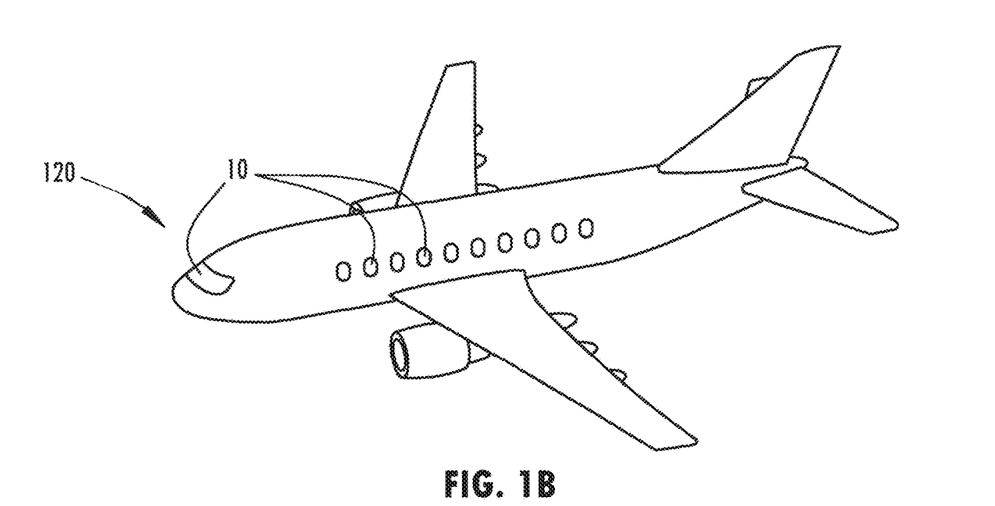
FIG. 1b: An embodiment of an electrochromic device.
Figure 1C:
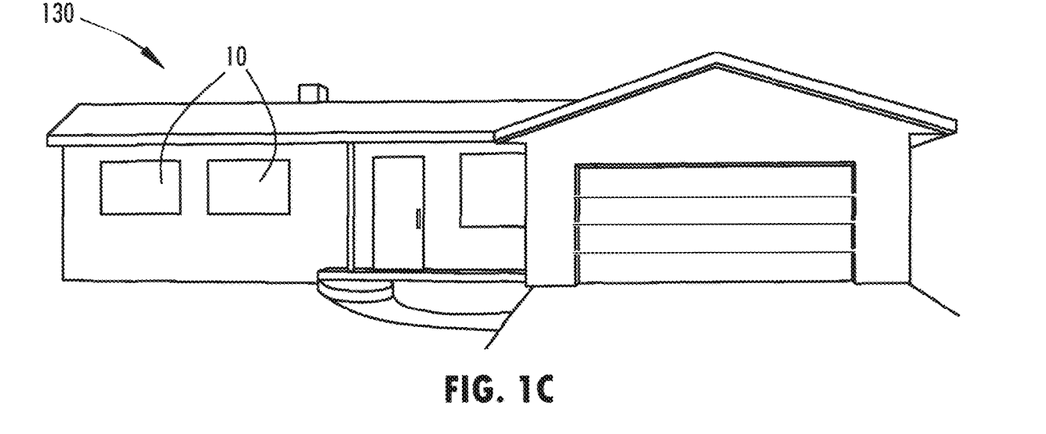
FIG. 1c: An embodiment of an electrochromic device.

FIGS. 1a-c illustrate particular embodiments of an electrochromic device. In some embodiments, as shown in FIG. 1a, an automobile 110 may comprise one or more electrochromic device in the form of a window 10, an external rear-view mirror 11, and/or an interior rear-view mirror 15. FIG. 1b illustrates another particular embodiment of an electrochromic device. In this embodiment, an airplane 120 comprises one or more electrochromic device in the form of a window 10. FIG. 1c illustrates yet another particular embodiment of an electrochromic device. In this embodiment, a building 130 may comprise one or more electrochromic device in the form of a window 10.

Window 10 may be a device configured to provide a physical barrier between two areas and be operable to allow the variable transmission of light between the two areas. Window 10 may come in many configurations. For example, window 10 may be in the form of a building window, a vehicle windshield, a vehicle side window, a vehicle rear-view window, or a sunroof.

External rear-view mirror 11 may be a device coupled to an automobile exterior configured to provide a viewer with a field of view comprising an exterior, to the rear or the side, of automobile 110. Further, interior rear-view mirror 11 may also be variably transmissive to minimize glare.

Interior rear-view mirror 13 may be a device, in an automobile interior, configured to provide a viewer with a field of view comprising a rearward exterior of automobile 110. Further, interior rear-view mirror 13 may also be variably transmissive to minimize glare.

Figure 2:
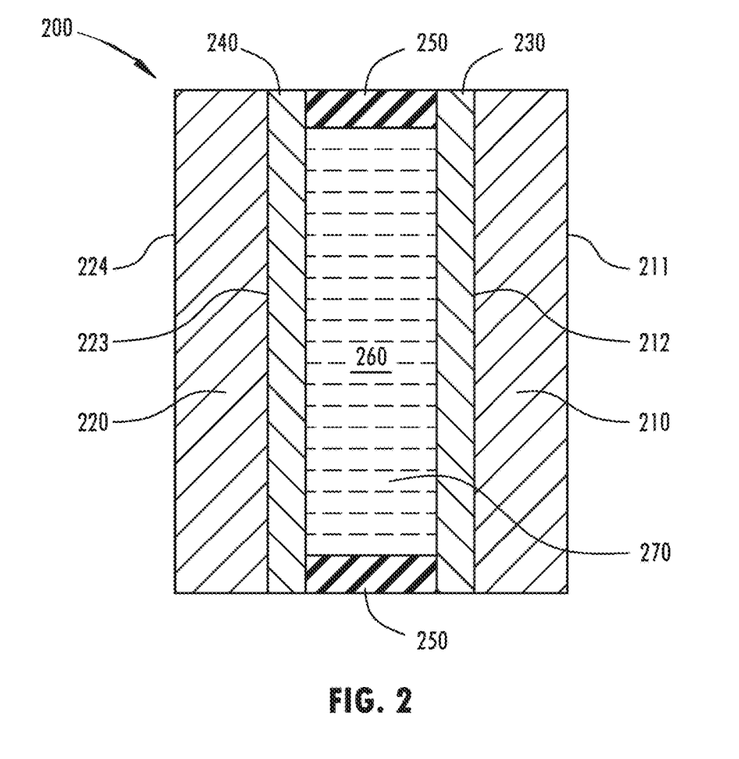
FIG. 2: A cross-sectional schematic representation of an electrochromic device.

FIG. 2 is a cross-sectional schematic representation of an electrochromic device 200. Electrochromic device 200, for example, may be a mirror, a window, a display device, a contrast enhancement filter, and the like. Further, FIG. 2 is merely a schematic representation of electrochromic device 200, and as such, some of the components have been distorted from their actual scale for pictorial clarity. Electrochromic device 200 may comprise: a first substrate 210, a second substrate 220, a first electrode 230, a second electrode 240, a seal 250, a chamber 260, and/or an electrochromic medium 270. Additionally, electrochromic device 200 may be operable between a substantially activated state and a substantially un-activated state. Operation between such states may correspond to a variable transmissivity of electrochromic device 200.

First substrate 210 may be substantially transparent in the visible and/or infrared regions of the electromagnetic spectrum. Further, first substrate 210 may have a first surface 211 and a second surface 212. First surface 211 and second surface 212 may be disposed opposite one another with second surface 212 disposed in a first direction relative first surface 210. The first direction may additionally be defined as substantially orthogonal the first and second surfaces 211, 212. Additionally, first substrate 210, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly (methyl methacrylate) (PMMA)), polymethacrylates, polyimides, polyamides (e.g., a cycloaliphatic diamine dodecanedioic acid polymer (i.e., Trogamid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment, such as ultra-violet light exposure from the sun, humidity, and temperature extremes.

Similarly, second substrate 220 may, have a third surface 223 and a fourth surface 224. Third surface 223 and fourth surface 224 may be disposed opposite one another with fourth surface 224 disposed in the first direction relative third surface 223. Additionally, second substrate 220 may be disposed in the first direction in a spaced apart relationship relative first substrate 210. Thus, third surface 223 may face second surface 212. In some embodiments, second substrate 220 may be substantially transparent in the visible and/or infrared regions. Accordingly, second substrate 220 may be comprised of the same or similar materials suitable for first substrate 210. In other embodiments, such as for a rearview mirror assembly, substantial transparency is not necessary. In such an embodiment, second substrate 220 may also be selected from substantially opaque and/or reflective materials.

First electrode 230 is an electrically conductive material. Further, first electrode 230 may be associated with second surface 212. Accordingly, first electrode 230 may be disposed on second surface 212. The electrically conductive material of first electrode 230 may be substantially transparent in the visible and/or infrared regions of the electromagnetic spectrum, bond reasonably well to first substrate 210, and/or be generally resistant to corrosion from materials of chamber material 270. For example, the electrically conductive material may be fabricated from a transparent conductive oxide (TCO), such as fluorine doped tin oxide (FTO), tin doped indium oxide (ITO), doped zinc oxide, indium zinc oxide, or other materials known in the art.

Second electrode 240 is, likewise, an electrically conductive material. Further, second electrode 240 is associated with third surface 223. Accordingly, second electrode 240 may be disposed on third surface 132. The electrically conductive material may be fabricated from the same or similar materials as first electrode 230. Accordingly, in some embodiments, second electrode 240 may be substantially transparent in the visible and/or infrared regions. In other embodiments, such as those where electrochromic devices 200 is a mirror, substantial transparency is not necessary. In such an embodiment, second electrode 240 may be selected from substantially opaque and/or reflective materials. Accordingly, in some embodiments, second electrode 240 may comprise a reflective coating. Typical coatings for this type of reflector include chromium, rhodium, ruthenium, silver, and combinations thereof.

Seal 250 may be disposed in a peripheral manner to, at least in part, define a chamber 260. Chamber 260 is disposed between first substrate 210 and second substrate 220. Accordingly, chamber 260 may be defined by seal 250 in conjunction with at least two of: first substrate 210, second substrate 220, first electrode 230, and second electrode 240. In some embodiments, chamber 260 may, more specifically, be defined by seal 250, first electrode 230, and second electrode 240. Seal 250 may comprise any material capable of being bonded to the at least two of: first substrate 210, second substrate 220, first electrode 230, and second electrode 240, to in turn inhibit oxygen and/or moisture from entering chamber 260, as well as inhibit electrochromic medium 270 from inadvertently leaking out. Seal 250, for example, may include epoxies, urethanes, cyanoacrylates, acrylics, polyimides, polyamides, polysulfides, phenoxy resin, polyolefins, and silicones. In some embodiments, seal 250 may bridge across and extend about peripheries of the first and second substrates 210, 220. In other embodiments, seal 250, is disposed between the first and second substrates 210, 220 in a peripheral manner. Further, seal 250 may extend all the way to the second and/or third surfaces 212, 223. In such an embodiment, the first and/or second electrodes 230, 240 may be partially removed where seal 250 is positioned. Alternatively, seal 250 may terminate at and/or extend between the first and second electrodes 230, 240.

Electrochromic medium 270 may be disposed in chamber 260. Accordingly, the electrochromic medium 270 may be disposed between the first and second electrodes 230, 240. In some embodiments, electrochromic medium 270 may be a solution. Accordingly, electrochromic medium 270 may comprise one or more solvent. Further, electrochromic medium 270 may comprise one or more electrochromic materials and/or a buffer. Each of the electrochromic materials and the buffer may be operable between substantially un-activated and substantially activated states. Further, the electrochromic materials may be electroactive anodic and cathodic materials that upon activation, due to the application of an electronic voltage or potential, exhibit a change in absorbance at one or more wavelengths of the electromagnetic spectrum. The change in absorbance may occur in the visible region of the electromagnetic spectrum. In some embodiments, the electrochromic materials may be disposed in one or more layers associated with the first and/or second electrodes 230, 240. In other embodiments, the electrochromic materials may be in solution. Accordingly, the electrochromic materials may be dissolved in the solvent. The buffer may be a redox buffer. In some embodiments, the buffer may be in solution. Accordingly, the buffer may be dissolved in a solvent. Further, the buffer may be chosen such that the buffer exhibits a redox potential in a range bound by an anodic oxidation potential and a cathodic reduction potential of the electrochromic materials. The electrochromic medium and the redox buffer may be fabricated from any one of a number of materials, including, for example, those disclosed in U.S. Pat. No. 6,433,914, entitled "COLOR-STABILIZED ELECTROCHROMIC DEVICES;" U.S. Pat. No. 6,697,185, entitled "COLOR-STABILIZED ELECTROCHROMIC DEVICES;" and U.S. Pat. No. 4,902,108, entitled "SINGLE-COMPARTMENT, SELF-ERASING, SOLUTION-PHASE ELECTROCHROMIC DEVICES, SOLUTIONS FOR USE THEREIN, AND USES THEREOF," the entireties of which are herein incorporated by reference.

Additionally, the solvent may compromise any of a number of common, commercially available solvents including 3-methylsulfolane, glutaronitrile, dimethyl sulfoxide, dimethyl formamide, acetonitrile, tetraglyme and other polyethers, alcohols such as ethoxyethanol, nitriles, such as 3-hydroxypropionitrile, 2-methylglutaronitrile, ketones including 2-acetylbutyrolactone, cyclopentanone, cyclic esters including beta-propiolactone, gamma-butyrolactone, gamma-valerolactone, propylene carbonate, ethylene carbonate and homogenous mixtures of the same. While specific solvents have been disclosed as being associated with the electrochromic medium 270, numerous other solvents that would be known to those having ordinary skill in the art may be used.

Electrochromic device 200 may be operable to vary its transmissivity. To vary the transmissivity, the first and second electrodes 230, 240 may operate to deliver an electrical potential across chamber 260. Therefore, the first and second electrodes 230, 240 may operate to apply an electrical potential to electrochromic medium 270. Accordingly, the electrochromic materials may become substantially activated. Activation of the electrochromic materials may correspond to the oxidation and reduction of the anodic and cathodic materials, respectively. The activation of the electrochromic materials may be to various degrees. The degree of activation may correspond to the percentage of anodic and cathodic materials that are activated. Further, via various degrees of activation, electrochromic medium 270 may be variably transmissive. In some embodiments, as the electrochromic materials are increasingly activated, the transmissivity may decrease. Accordingly, electrochromic medium 270 and thus electrochromic device 200 may increasingly darken. Conversely, as the electrochromic materials are decreasingly activated, the transmissivity may increase.

During electrochromic activation, the buffer may slow the activation of the electrochromic materials. The electrical potential introduces current to electrochromic medium 270. The redox buffer may initially consume the current to a greater extent than the electrochromic materials, due to its redox potential being bound by the electrochromic materials' respective oxidation and reduction potentials. This may occur to some extent until the buffer has become fully activated. Accordingly, the first and second electrodes 230, 240 are operable to apply a buffer pre-activation voltage. The buffer pre-activation voltage may be operable to substantially activate the buffer, but not substantially activate the electrochromic materials. Accordingly, the electrochromic materials my exhibit an activation percentage of less than or equal to 20, 15, 10, 5, 4, 3, 2, or 1 percent due to application of the buffer pre-activation voltage.

Further, electrochromic device 200 may be manually or automatically operated. When in manual operation, user may operate a user interface to select a level of transmittance for electrochromic device 200. When in automatic operation, circuitry and one or more sensor may be utilized to sense light and communicate a light condition to a controller. The controller may comprise a memory and a processor. The memory may be operable to store one or more algorithm. The algorithm may by operable to determine an appropriate level of transmittance for the light condition and regulate the electrical voltage applied to the first and second electrodes 230, 240 accordingly. The processor may be operable to execute the algorithm.

Embodiments of the present disclosure may have the advantage of a faster and more responsive electrochromic device 200. Application of a buffer pre-activation voltage may partially activate electrochromic medium 270, such that the buffer is substantially or fully activated prior to a desired change in electrochromic device 200 transmittance. Accordingly, when an electrical potential is applied to change electrochromic device 200 transmittance, presence of the redox buffer will not initially consume additional current, because the redox buffer is already activated. Therefore, the electrochromic materials may be allowed to consume a greater amount of the current and thereby activate faster, increasing the speed of transmittance change.

Figure 3:
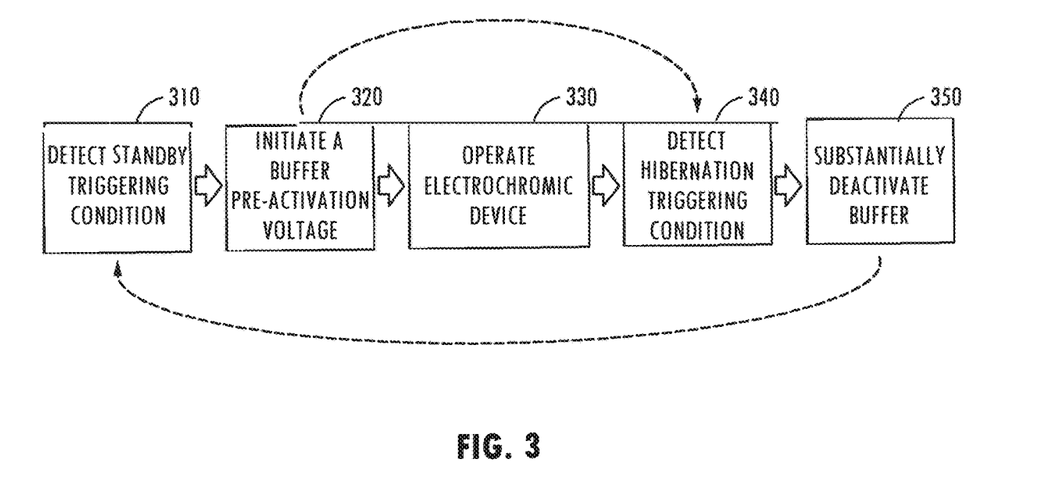
FIG. 3: A process flowchart for managing an electrochromic device with buffer pre-activation.

FIG. 3 is a process flow diagram for operating an electrochromic device with buffer pre-activation, such as the electrochromic device 100 of FIG. 2. The process may comprise one or more of the steps of detecting a standby triggering condition 310; initiating a buffer pre-activation voltage 320; detecting a hibernation triggering condition 340; and substantially deactivating buffer 350. In some embodiments, the process may also comprise the step of operating the electrochromic device 330.

In step 310, a standby triggering condition may be detected. A standby triggering condition may be a condition where operation of the electrochromic device may be required to vary the electrochromic device's transmittance. The standby triggering condition may be detected by a controller comprising a processor and a memory. Further, the controller may be directly or indirectly connected to one or more sensor to indicate the presence of a standby condition. For example, a standby triggering condition may comprise a starting of a vehicle, as when the vehicle is running, a user is likely to require the operation of the electrochromic device. Additionally, the occupancy of the vehicle may constitute a standby triggering condition as electrochromic device operation is more likely to be required when the vehicle is occupied. Accordingly, the controller, for example, may sense the presence of a standby triggering condition by connection to the vehicle's ignition or CAN, a weight sensor, and/or an imager.

In step 320, a buffer pre-activation voltage may be initiated. The buffer pre-activation voltage may be initiated by the controller based, at least in part, on the detection of the standby triggering condition. Accordingly, the controller may initiate the buffer pre-activation voltage by delivering an electrical potential across two electrodes of the electrochromic device. The buffer pre-activation voltage may enable the electrochromic device to enter a standby ready state where the buffer in the electrochromic medium is a least partially activated, thereby allowing for faster and more responsive device performance when a change in transmittance is commanded. In some embodiments, the buffer may be fully activated. Additionally, in some embodiments, the buffer pre-activation voltage may not substantially activate the electrochromic materials. Accordingly, the electrochromic materials my exhibit an activation percentage of less than or equal to 20, 15, 10, 5, 4, 3, 2, or 1 percent due to application of the buffer pre-activation voltage.

In step 330, the electrochromic device may be operated. The operation of the electrochromic device may include varying the transmittance of the electrochromic materials in the device. Accordingly, this is the step where the device is actually used with the benefit of the faster and more responsive performance due to the buffer pre-activation. This operation may be carried out by the controller, which may in turn change the electrical potential across the two electrodes of the electrochromic device.

In step 340, a hibernation triggering condition may be detected. A hibernation triggering condition may be a condition where a potential need for the electrochromic device is likely no longer present. The hibernation triggering condition may be detected directly or indirectly by the controller via one or more sensor. In some embodiments, the hibernation triggering condition may comprise the removal of the standby triggering condition. For example, the hibernation triggering condition may be the turning off the vehicle or the absence of an occupancy for the vehicle. Accordingly, the controller, for example, may detect the presence of a hibernation triggering condition by removal of a key, connection to a vehicle's CAN, weight sensors, or imagers. Turning off the vehicle or removing a key, for example, may signify that the vehicle is no longer being driven and therefore variable transmittance operations are no longer required. Likewise, sensing via weight sensors, imagers, or other means may be used to determine the vehicle is not occupied and therefore that variable transmittance operations are no longer required.

In step 350, the buffer may be substantially deactivated. The buffer may be substantially deactivated by the controller based, at least in part, on the detection of the hibernation triggering condition. Accordingly, the controller may deactivate the buffer by reducing the electrical potential across the two electrodes of the electrochromic device to a value substantially below the buffer's activation potential. Additionally, in such as state, the electrochromic materials may also be substantially de-activated.

Embodiments of the present disclosure may have the advantages of device durability and energy savings, while reaping the benefits of the buffer pre-activation. First, applying a buffer pre-activation voltage to the electrochromic solution may require power. Accordingly, by eliminating the buffer pre-activation voltage application when the electrochromic properties of the device are not likely to be needed, energy is saved. Second, electrochromic materials sometimes do not adequately return to a predetermined state during normal operation. Further, in some instances—even in the absence of an electrical potential—anodic and cathodic materials of the electrochromic medium may partially oxidize or reduce, respectively. This reduction and oxidation may result in an undesirable residual coloration of the electrochromic medium. These oxidations and reductions are mitigated by the presence of a redox buffer in the electrochromic medium.

Figure 4A:
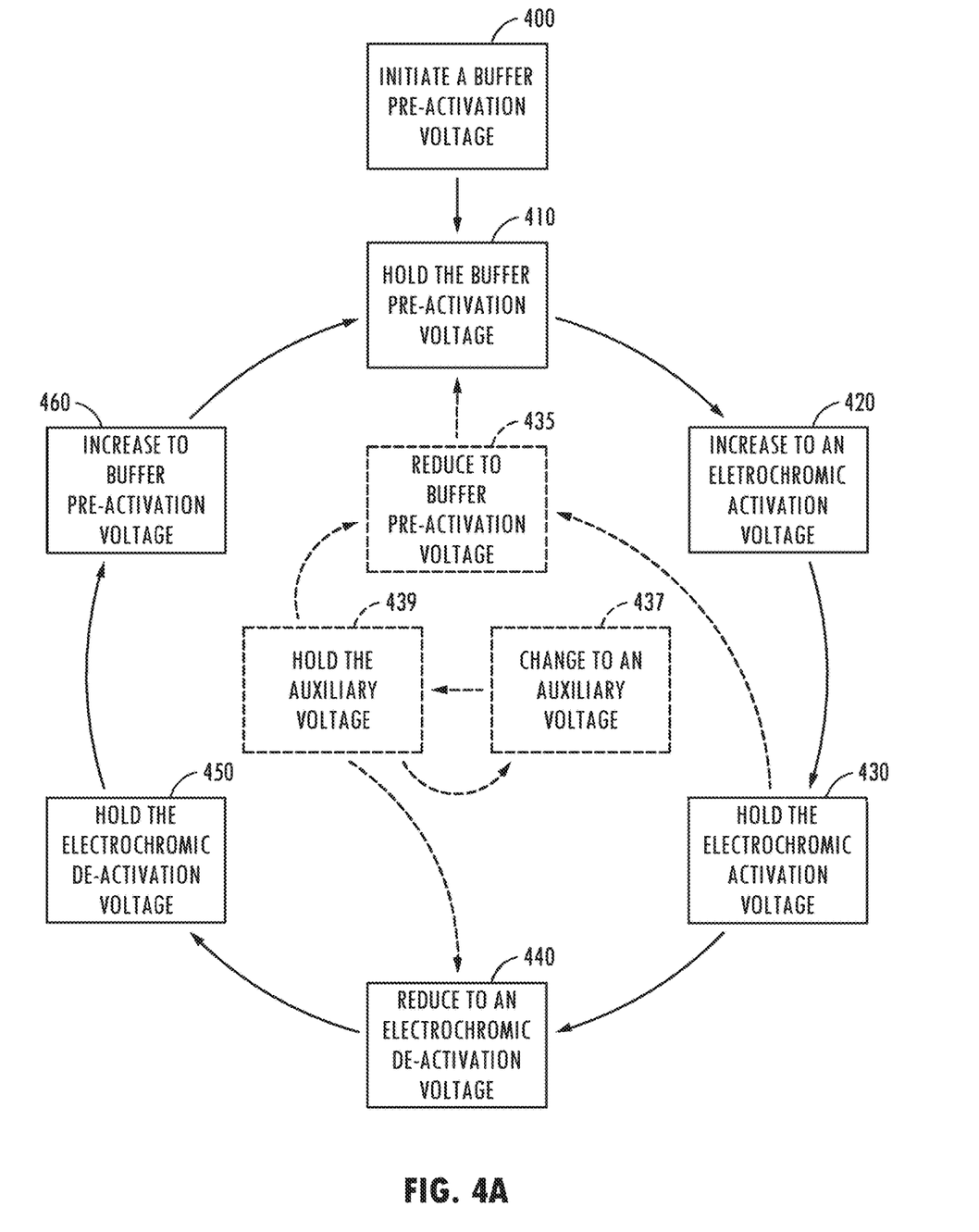
FIG. 4a: A process flowchart for operating an electrochromic device with buffer pre-activation.

FIG. 4a is a process flowchart for operating an electrochromic device with buffer pre-activation, such as the electrochromic device 100 of FIG. 2. The process of operating the electrochromic device with buffer pre-activation comprises the steps of: initiating a buffer pre-activation voltage 400, holding the buffer pre-activation voltage 410, increasing to an electrochromic medium activation voltage 420, and holding the electrochromic medium activation voltage 430. These and other steps of the process depicted in FIG. 4a may be accomplished by a controller, directly or indirectly, applying, increasing, decreasing, or holding an electrical potential or voltage across two electrodes of the electrochromic device. Further, holding a voltage may take various forms. Holding a voltage, for example, may be done by the controller constantly applying, oscillating, or pulsing a voltage across the electrodes, such that an overall activation or deactivation is generally maintained at a level.

Step 400 depicts the first step of initiating a buffer pre-activation voltage. This voltage is responsible for activating the electrochromic medium such that the buffer's requirement for additional current for activation is substantially reduced or eliminated, thereby allowing subsequent activation current to go more substantially towards the electrochromic material activation. However, while the buffer pre-activation voltage is intended to activate the buffer, there may be some collateral electrochromic material activation as well. This collateral electrochromic material activation may possibly lead to a decrease in the electrochromic device's high-end transmittance. However, in some embodiments, the electrochromic material activation may not be substantial, despite any collateral activation. Accordingly, the electrochromic materials my exhibit an activation percentage of less than or equal to 20, 15, 10, 5, 4, 3, 2, or 1 percent due to application of the buffer pre-activation voltage.

In some embodiments, this buffer pre-activation voltage may be equal to the activation potential of the buffer. However, the buffer pre-activation voltage may also be less than or greater than the activation potential of the buffer. If the buffer pre-activation voltage is less than the buffer activation potential, the buffer may be only partially pre-activate and the electrochromic material activation lag may be greater than if the buffer were fully activated, but less than if there was no buffer pre-activation voltage applied to the electrochromic medium. If the buffer pre-activation voltage is more than the buffer activation potential, the buffer may fully pre-activate, but the degree of electrochromic material activation of the stand-by state may increase, effectively reducing the dynamic range of the electrochromic device on the high transmittance end. In particular, the buffer pre-activation voltage may be at or about 0.10, 0.15, 0.20, 0.25, 0.30, 0.35, 0.40, 0.45, 0.50, or 0.55 volts.

Step 410 depicts the subsequent step of holding the buffer pre-activation voltage to maintain buffer pre-activation. Accordingly, the overall activation of the buffer may generally be maintained at the same level.

Step 420 depicts the next step of the process, wherein the voltage may be increased to an electrochromic activation voltage to substantially activate the electrochromic materials. Accordingly, the activation of the electrochromic materials may be substantially increased. The voltage of the electrochromic activation voltage may be determined by the degree of desired light transmission.

Step 430 depicts holding the electrochromic activation voltage to maintain a corresponding level of electrochromic material activation. The electrochromic activation voltage will be held for as long as the level of electrochromic activation—or in other words, device darkening—is desired. Holding the voltage, for example, may be done such that the overall activation is generally maintained at the same level.

In some embodiments, the process of operating the electrochromic device with buffer pre-activation may further comprise one or more of the steps of: reducing the applied voltage to an electrochromic deactivation voltage 440, holding the electrochromic deactivation voltage 450, increasing to the buffer pre-activation voltage 460, and holding the buffer pre-activation voltage 410.

In step 440, the voltage may be reduced to an electrochromic de-activation voltage. The electrochromic de-activation voltage may be opposite in sign (i.e. positive or negative) of the buffer pre-activation and electrochromic activation voltages, thereby speeding up the de-activation of the electrochromic materials. Further, the electrochromic de-activation voltage may equal the buffer pre-activation voltage in magnitude. For example, the buffer de-activation voltage may be at or about −0.10, −0.15, −0.20, −0.25, −0.30, −0.35, −0.40, −0.45, −0.50, or −0.55 volts. Additionally, the electrochromic de-activation voltage may be operable to substantially de-activate the electrochromic materials and/or the buffer.

Subsequently, in step 450, the electrochromic deactivation voltage may be held. This voltage may be held to continue the electrochromic material deactivation until the desired level of deactivation of the electrochromic materials and/or buffer is achieved. Further, the electrochromic deactivation voltage may be held such that the overall de-activation rate is generally maintained.

Next, in step 460, the applied voltage may be increased back to a buffer pre-activation voltage. Increasing the voltage back to the buffer pre-activation voltage thereby returns the device back to the stand-by state. In some embodiments, the buffer pre-activation voltage of step 460 is equal to the buffer pre-activation voltage of step 400, however, the buffer pre-activation voltages may be different.

Additionally, in embodiments not comprising steps 440, 450, and/or 460, after step 430, wherein the electrochromic activation voltage is held, the process may proceed to step 435 where the voltage may be reduced to a buffer pre-activation voltage. Accordingly, the electrochromic medium may be returned a to a stand-by state where the buffer is pre-activated. Following the reduction of the voltage to the buffer pre-activation voltage in step 435, the process may additionally proceed back to step 410 where the buffer pre-activation voltage may be held.

Advantageously, in some embodiments, the electrochromic device operation process with buffer pre-activation may further comprise step 437. In step 437, the voltage may be changed to an auxiliary voltage. The auxiliary voltage may correspond to a different level of electrochromic material activation or device darkening. Additionally, in some embodiments, after changing to the auxiliary voltage of step 437, the process may further proceed to step 439, wherein the auxiliary voltage is held for as long as the auxiliary state is desired. Further, in some embodiments, step 439 may loop back to step 437 enabling additional auxiliary states. Furthermore, in some embodiments, these auxiliary state steps may then proceed to, and take advantage of, the process steps of 440, 450, and/or 460. Alternatively, it is contemplated that step 439 may proceed to the stand-by state directly through step 435, without the benefit of steps 440, 450, and/or 460.

Some embodiments of the present disclosure may have the advantages of faster and more responsive electrochromic device transmittance changes. Additionally, process steps 440, 450, and 460 increase the deactivation rate when returning to the standby pre-activated buffer stage, likewise providing faster and more responsive device transmittance changes, as well. Further, the addition of steps 437 and 439 may thereby allow the device to be further adaptive and change to various states of darkening due to ever changing conditions, without the need to revert all the way back to the buffer pre-activated stand-by state of step 410.

Figure 4B:
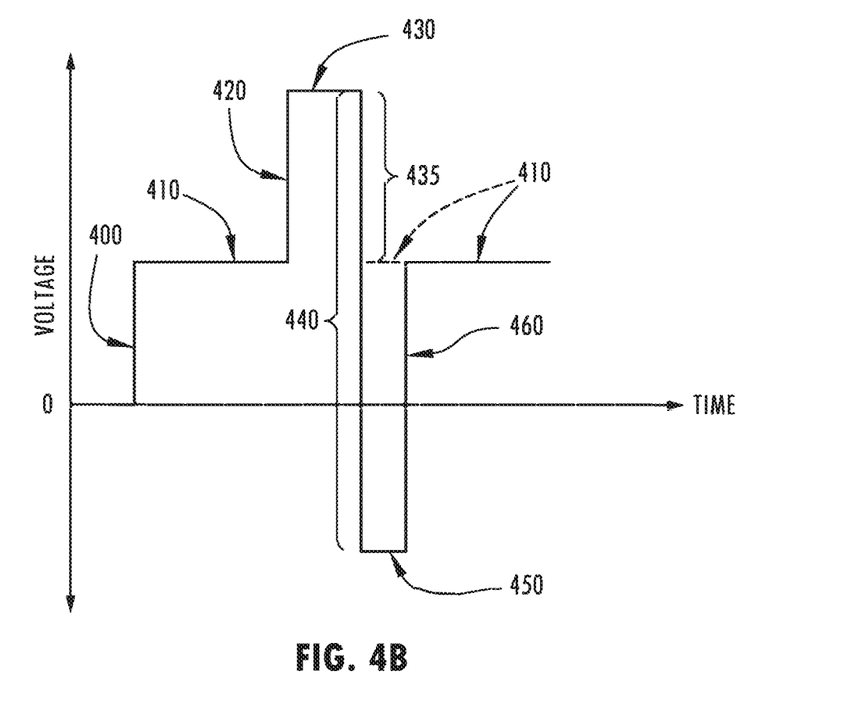
FIG. 4b: A schematic graph of process voltages.

FIG. 4b is a voltage diagram depicting the voltage stages of an embodiment of the process outlined in FIG. 4a, over time. However, FIG. 4b is merely a schematic graph depicting the rise and fall relationship of the various stages in terms of voltage, and as such, the relative magnitudes and durations are for illustrative purposes only. Further, the transitions from one voltage to another may not be perfectly stepwise as depicted and may actually comprise smoothed-out transitions from one voltage to another.

Section 400 depicts the first step of initiating a buffer pre-activation voltage. This voltage may be responsible for activating the buffer such that the buffer no longer requires activation, thereby allowing subsequent activation to go more substantially towards the electrochromic materials. However, while the buffer pre-activation voltage is intended to activate the buffer, there may be some collateral electrochromic material activation, as well.

In some embodiments, this buffer pre-activation voltage is equal to the activation potential of the buffer. However, the buffer pre-activation voltage may be less than or greater to the activation potential of the buffer. If the buffer pre-activation voltage is less than the buffer activation potential, the buffer may only partially pre-activate and the electrochromic material activation lag may be greater than if the buffer were fully activated, but less than if there was no buffer pre-activation voltage applied to the electrochromic medium. If the buffer pre-activation voltage is more than the buffer activation potential, the buffer may be fully pre-activated, but the degree of electrochromic material activation of the stand-by state may be increased, effectively reducing the dynamic range of the electrochromic device on the high transmittance end. In particular, the buffer pre-activation voltage may be at or about 0.10, 0.15, 0.20, 0.25, 0.30, 0.35, 0.40, 0.45, 0.50, or 0.55 volts.

Section 410 depicts the subsequent step of holding the buffer pre-activation voltage to maintain buffer pre-activation. Further, holding a voltage may take various forms. Holding a voltage, for example, may be done by constantly applying, oscillating, or pulsing a voltage, such that the overall activation is generally maintained at the same level. Accordingly, the overall activation of the buffer may generally be maintained at the same level.

Section 420 depicts the next step of the process. In section 420, the voltage is increased to an electrochromic activation voltage to activate the electrochromic medium. The voltage to which the electrochromic medium activation voltage is increased will be determined by the degree of desired light transmission.

Section 430 depicts holding the electrochromic activation voltage to maintain the corresponding level of electrochromic activation. The electrochromic medium activation voltage will be held for as long as the level of electrochromic activation—or in other words, device darkening—is desired. Holding the voltage, for example, may be done, such that the overall activation is generally maintained at the same level.

Sections 440, 450, and 460 depict the steps of: lowering to an electrochromic deactivation voltage 440, holding the electrochromic medium deactivation voltage 450, and increasing to the buffer pre-activation voltage 460.

In section 440, the voltage is reduced to an electrochromic de-activation voltage, wherein the electrochromic de-activation voltage is opposite in polarity (i.e. positive or negative) relative the buffer pre-activation and electrochromic activation voltages, thereby speeding up the de-activation of the electrochromic materials. Further, while the electrochromic de-activation voltage is opposite in polarity, in some embodiments, it may be equal to the buffer pre-activation voltage in magnitude. In particular, the buffer de-activation voltage may be at or about −0.10, −0.15, −0.20, −0.25, −0.30, −0.35, −0.40, −0.45, −0.50, or −0.55 volts.

In section 450, the electrochromic deactivation voltage is held. This voltage is held for the purpose of continuing the electrochromic material deactivation until the desired level of deactivation is achieved. Further, the electrochromic deactivation voltage may be held such that the overall de-activation rate is generally maintained.

In section 460, the applied voltage is increased back to a buffer pre-activation voltage. Increasing the voltage back to the buffer pre-activation voltage thereby returns the device back to the stand-by state, wherein the buffer is held in a pre-activated state.

Additionally, section 435 represents the alternative pathway of reducing the voltage to the buffer pre-activation voltage and not taking advantage of the steps of lowering to an electrochromic deactivation voltage, holding the electrochromic medium deactivation voltage, and increasing to the buffer pre-activation voltage.

Figure 5:
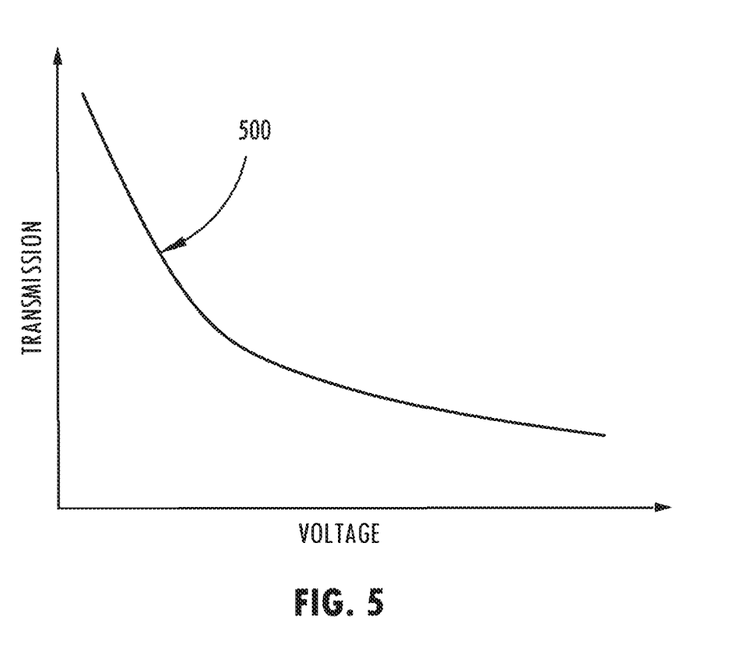
FIG. 5: A schematic graph of electrochromic medium transmission as a function of applied voltage.

FIG. 5 depicts an exemplary schematic of the percent transmission of light as a function of voltage applied to an electrochromic medium. As line 500 shows, the percent transmission of light—or in other words, the amount of darkening of the electrochromic materials—is directly related to the voltage applied thereto. Accordingly, this relationship, which will vary depending on the electrochromic materials used, will determine the electrochromic activation voltage needed to achieve a desired degree of darkening.

Figure 6:
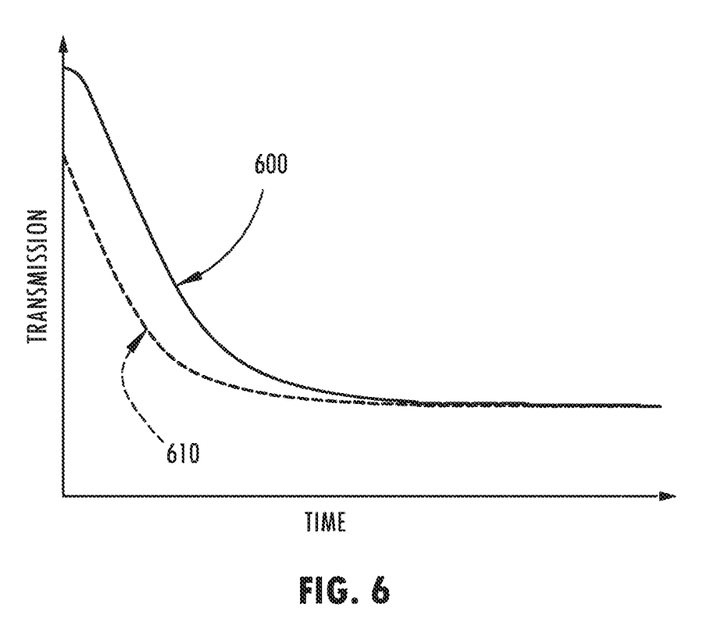
FIG. 6: A schematic graph comparing light transmission as a function of time with and without buffer pre-activation.

FIG. 6 depicts a schematic graph comparing light transmission as a function of time with and without buffer pre-activation. Line 610 plots the transmission of an electrochromic medium over time when there is no buffer pre-activation voltage applied and held prior. Conversely, line 610 plots the transmission of the electrochromic medium when the buffer pre-activation voltage was previously initiated and held to pre-activate the electrochromic medium into a standby state. Electrochromic medium transmission is decreasing for these lines, accordingly, this graph represents electrochromic material darkening.

These plots show that when the buffer is pre-activated into a standby state, the electrochromic device approaches its dimmed state faster. This is advantageous for faster response time, however, it comes at the cost of reduced dynamic range on the high transmission end, as shown by the reduced transmittance of 610 at the zero-time starting point. This reduction of dynamic range is the result of collateral electrochromic material activation during the application of the buffer pre-activation voltage.

Figure 7:
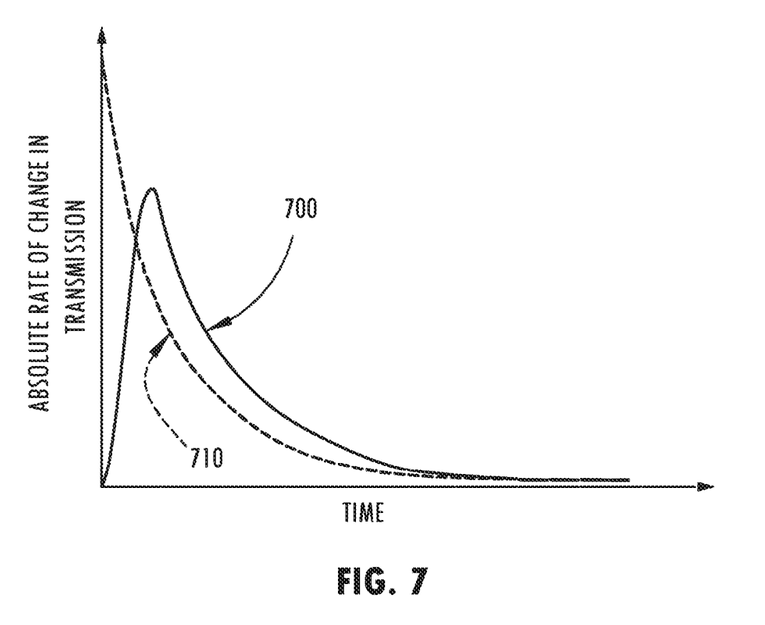
FIG. 7: A schematic graph of the absolute rate of change in transmission of an electrochromic solution as a function of time.

FIG. 7 is a schematic graph showing the absolute rate of change in transmission of the electrochromic solution as a function of time. In other words, FIG. 7 shows how fast the electrochromic device is darkening, when a darkening voltage is applied. Plot 700 is the rate of change of the electrochromic medium when the buffer was not pre-activated prior applying the electrochromic activation voltage. Conversely, plot 710 is the rate of change of the electrochromic medium when the buffer is pre-activated prior to the electrochromic activation voltage application.

These plots demonstrate the effect and related advantage of activating the buffer prior to darkening. At the start of the darkening, when the buffer is not pre-activated, the electrochromic materials activate more slowly, represented by the initial upward slope of plot 700. This is because the buffer was not pre-activated, therefore, the buffer activation is taking place during this stage, consuming available electrical current and thereby reducing the current available for electrochromic material activation. However, this penalty is increasingly reduced as the buffer is increasingly activated, accounting for the upward slope. Further, the peak of plot 700 represents the point at which the buffer has become activated and therefore no longer has increased consumption of current, current which is needed by the electrochromic materials. Plot 710 starts at its high point in rate because the buffer was already activated, thereby there is no reduction in available current for electrochromic material activation at the start of the darkening. Further, the plots show that after the peak, the two rates are substantially parallel to each other, with plot 700 being delayed in time. Therefore, the activation of the buffer prior to the darkening phase has the benefit of a more responsive system wherein the effect of applying and holding the electrochromic activation voltage can more readily be observed by an operator of the electrochromic device.

In the appending claims, voltages may be referred to as a first voltage, second voltage, third voltage, etc., but the denotation of first, second, third, etc. serves only to distinguish one entity or action from another entity or action, without necessarily requiring or implying any such actual relationship or order between such entities or actions. For example, a first voltage may refer to a buffer pre-activation voltage or an electrochromic medium activation voltage, depending on the circumstances of the claim and which parts of the process are being claimed. Accordingly, in this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The terms "including," "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element preceded by "comprises a . . . " does not, without more constraints, preclude the existence of additional identical elements in the process, method, article, or apparatus that comprises the elements.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A system comprising:
an electrochromic device comprising an electrochromic medium, the electrochromic medium comprising electrochromic materials and a redox buffer; and
a controller operable to:
- initiate a first DC voltage across the electrochromic medium, the first DC voltage operable to substantially activate the buffer;
- hold the first DC voltage, wherein holding the first DC voltage is operable to substantially maintain the buffer activation;
- initiate a second DC voltage across the electrochromic medium, the second DC voltage greater than the first DC voltage, and the second DC voltage operable to substantially increase an activation state of the electrochromic materials; and
- hold the second DC voltage, holding the second DC voltage operable to maintain the increased activation of the electrochromic materials.

2. The system of claim 1, further comprising:
a standby triggering sensor, operable to detect a standby triggering condition;
wherein the controller is further operable to:
receive a signal from the standby triggering first sensor, the signal corresponding to the detection of the standby triggering condition, and
based, at least in part, on the detection of the standby triggering condition, initiate the first DC voltage.

3. The system of claim 2, wherein:
a hibernation triggering sensor is operable to detect a hibernation triggering condition; and
the controller is further operable to:
receive a second signal from the hibernation triggering sensor, the second signal corresponding to the detection of the hibernation triggering condition; and
based, at least in part, on the receipt of the second signal, initiate a third DC voltage operable to substantially deactivate the buffer.

4. The system of claim 1, wherein the first and second DC voltages have the same polarity.

5. The system of claim 1, wherein:
the controller is further configured to:
apply a third DC voltage to the electrochromic medium to substantially de-activate the electrochromic materials and the redox buffer, the third DC voltage opposite in polarity relative the first and second DC voltages; and
then apply a fourth DC voltage to substantially activate the redox buffer without substantially activating the electrochromic materials, the fourth DC voltage having the same polarity as the first and second DC voltages.

6. The system of claim 5, wherein the first and third DC voltages are equal in absolute magnitude.

7. The system of claim 5, wherein the fourth DC voltage is substantially equal to the first DC voltage.

8. The system of claim 1, wherein the electrochromic materials are not substantially activated upon application of the first DC voltage.

9. The system of claim 1 wherein the controller is further configured to:
initiate a third DC voltage, the third DC voltage operable to substantially change the degree of activation of the electrochromic materials, the third DC voltage being different from the first DC voltage; and
hold the third DC voltage, holding the third DC voltage operable to maintain activation of the electrochromic materials.

10. The system of claim 1, wherein: the controller holds the first DC voltage, based, at least in part, on the controller receiving a standby signal from another device.

11. The system of claim 1, wherein the buffer is substantially activated without substantially activating the electrochromic materials such that the electrochromic materials exhibit an activation of less than one percent.

12. The system of claim 1, further comprising a user interface to allow a user to manually vary the transmittance of the electrochromic device.

* * * * *